US00RE35482E

United States Patent [19]

Johnson

[11] E Patent Number: Re. 35,482

[45] Reissued Date of Patent: Mar. 25, 1997

[54] TOWING HITCH

[75] Inventor: Andrew B. Johnson, deceased, late of Barton, N. Dak., by Arline Johnson; Legal Representative

[73] Assignee: Dethmers Mfg. Co., Boyden, Iowa

[21] Appl. No.: 410,105

[22] Filed: Mar. 24, 1995

Related U.S. Patent Documents

Reissue of:

[64] Patent No.: 5,232,240
Issued: Aug. 3, 1993
Appl. No.: 968,195
Filed: Oct. 29, 1992

[51] Int. Cl.[6] ..... B60D 1/167

[52] U.S. Cl. ..... 280/491.5; 280/491.4; 280/493

[58] Field of Search ..... 280/491.5, 491.4, 280/493, 494, 495, 491.1, 402, 480, 480.1, 478.1, 479.3

[56] References Cited

U.S. PATENT DOCUMENTS

| | | | |
|---|---|---|---|
| 772,293 | 10/1904 | Reese | 403/93 |
| 2,027,499 | 1/1936 | Tully | 280/492 |
| 2,139,970 | 12/1938 | Moore | 280/33.44 |
| 2,419,719 | 4/1947 | Kennedy | 97/69 |
| 2,457,885 | 1/1949 | Gatch | 280/486 |
| 2,746,771 | 5/1956 | Gross | 280/494 |
| 2,871,030 | 1/1959 | Hollis | 280/492 |
| 3,281,162 | 10/1966 | Carson | 280/478 |
| 3,384,391 | 5/1968 | Batke | 280/478 |
| 3,492,022 | 1/1970 | Hansen | 280/478 |
| 3,572,765 | 3/1971 | Tieben | 280/491 |
| 3,679,231 | 7/1972 | Deer, Jr. | 280/491.5 |
| 3,730,557 | 5/1973 | Cox | 280/504 |
| 3,740,074 | 6/1973 | Coil | 280/402 |
| 3,794,355 | 2/1974 | Cracolice | 280/482 |
| 3,806,162 | 4/1974 | Milner | 280/491.1 |
| 3,843,164 | 10/1974 | Flegel | 280/492 |
| 3,938,830 | 2/1976 | Lane | 280/493 |
| 3,947,062 | 3/1976 | Pierce | 293/69 R |
| 4,200,306 | 4/1980 | Helms | 280/494 |
| 4,548,423 | 10/1985 | Craven | 280/492 |
| 4,588,199 | 5/1986 | Fisher | 280/204 |
| 4,603,874 | 8/1986 | Merrill | 280/402 |
| 4,640,523 | 2/1987 | Wolmarans | 280/491.5 |
| 4,711,461 | 12/1987 | Fromberg | 280/494 |
| 4,727,949 | 3/1988 | Rea et al. | 180/9.32 |
| 4,869,521 | 9/1989 | Johnson | 280/491.1 |
| 5,000,473 | 3/1991 | Johnson | 280/491.1 |
| 5,186,483 | 2/1993 | Sheppard | 280/494 |

FOREIGN PATENT DOCUMENTS

| | | | |
|---|---|---|---|
| 269114 | 1/1971 | U.S.S.R. . | |
| 725339 | 3/1955 | United Kingdom | 280/493 |

*Primary Examiner*—Kevin Hurley
*Attorney, Agent, or Firm*—Brian J. Laurenzo; Kent A. Herink

[57] ABSTRACT

A towing hitch includes a frame having a forward portion selectively connected to the receiver hitch of a towing vehicle, and a rearward portion having a pair of elongated bars pivotally connected thereto for removable connection to a vehicle to be towed. Each bar has a pivot arm connected to the rearward end thereof, said pivot arms and bars all pivotal within a single plane, so that the pivot arms may be folded into a storage position adjacent and parallel *to* the bars. Selective locking apparatus permits the pivot arms to be extended to a towing position aligned with the bars and locked in the towing position. The bars are pivotally connected to a pivot block which is pivotally mounted to the forward portion of the frame, so as to permit the pivot block, and attached bars and arms to pivot from a generally horizontal position to a generally vertical storage position. The pivot block is mounted on a rotatable yoke, such that the bars and pivot arms are rotatable, as a unit, along an axis parallel to the direction which a vehicle is being towed.

10 Claims, 5 Drawing Sheets

TOWING HITCH

Matter enclosed in heavy brackets [ ] appears in the original patent but forms no part of this reissue specification; matter printed in italics indicates the additions made by reissue.

TECHNICAL FIELD

The present invention relates generally to hitches for towing vehicles, and more particularly to an improved hitch for towing a vehicle which may be removably installed on a conventional receiver hitch and which will collapse for easy storage.

BACKGROUND OF THE INVENTION

Various tow bars for towing vehicles have been known for many years. However, conventional tow bars are typically bulky, heavy structures which require a fairly lengthy amount of time to install between the vehicles, and a similar amount of time to remove once the vehicle has been towed to the desired location.

Furthermore, prior art towing apparatus were designed for complete removal from the towed vehicle upon arrival at the desired location. Removal of the towing apparatus was also conventionally inconvenient and time-consuming. Thus, in those instances where it was desired to use the vehicle intermittently, it was necessary to completely remove and install conventional towing apparatus at each stop. Such a time-consuming effort was frustrating for the user, and detracted from the desirability of towing a vehicle.

The inventor herein solved many of these problems by virtue of the collapsible towing hitch of his two previous patents, U.S. Pat. No. 4,869,521 and U.S. Pat. No. 5,000,473. While these patents greatly reduced the time necessary to connect and disconnect a vehicle to be towed, the devices disclosed therein still suffer some drawbacks.

While the devices of the inventor's previous patents permitted quick and simple connection of a towed vehicle to a [rowing] *towing* vehicle, the towing hitch remained on the towed vehicle when not in use. The [astatic] *aesthetic* appearance of a collapsed towing hitch on the front end of a vehicle is not always appealing to all consumers. Since the collapsible towing hitch is bolted directly to the bumper of the vehicle, it is not a quick and simple task to remove the hitch from the towed vehicle.

It is therefore a general object of the present invention to provide an improved removable hitch for towing vehicles or the like.

Another object of the present invention is to provide a towing hitch which is collapsible for storage on the towing vehicle.

Yet another object is to provide an improved hitch which may *be* easily expanded for towing purposes, and easily collapsed to a storage position.

Still another object of the present invention is to provide a towing hitch which is easy to install on the towed vehicle.

Yet another object of the present invention is to provide a towing hitch which is easily removable from the towing vehicle.

These and other objects of the present invention will be apparent to those skilled in the art.

SUMMARY OF THE INVENTION

The towing hitch of the present invention includes a frame having a forward portion which may be selectively connected to the receiver hitch of a towing vehicle, and a rearward portion having a pair of elongated bars pivotally connected thereto for removable connection to a vehicle to be towed. Each bar has a pivot arm connected to the rearward end thereof, said pivot arms and bars all pivotal within a single plane, so that the pivot arms may be folded into a storage position adjacent and parallel *to* the bars. Selective locking apparatus permits the pivot arms to be extended to a lowing position aligned with the bars and locked in the towing position. The bars are pivotally connected to a pivot block which is pivotally mounted to the forward portion of the frame, so as to permit the pivot block, and attached bars and arms to pivot from a generally horizontal position to a generally vertical storage position. The pivot block is mounted on a rotatable yoke, such that the bars and pivot arms are rotatable, as a unit, along an axis parallel to the direction which a vehicle is being towed.

BRIEF DESCRIPTION OF THE DRAWINGS

FIG. I is a perspective view of the towing hitch of the present invention mounted in a receiver hitch on a vehicle.

DESCRIPTION OF THE PREFERRED EMBODIMENT

Figure 1:
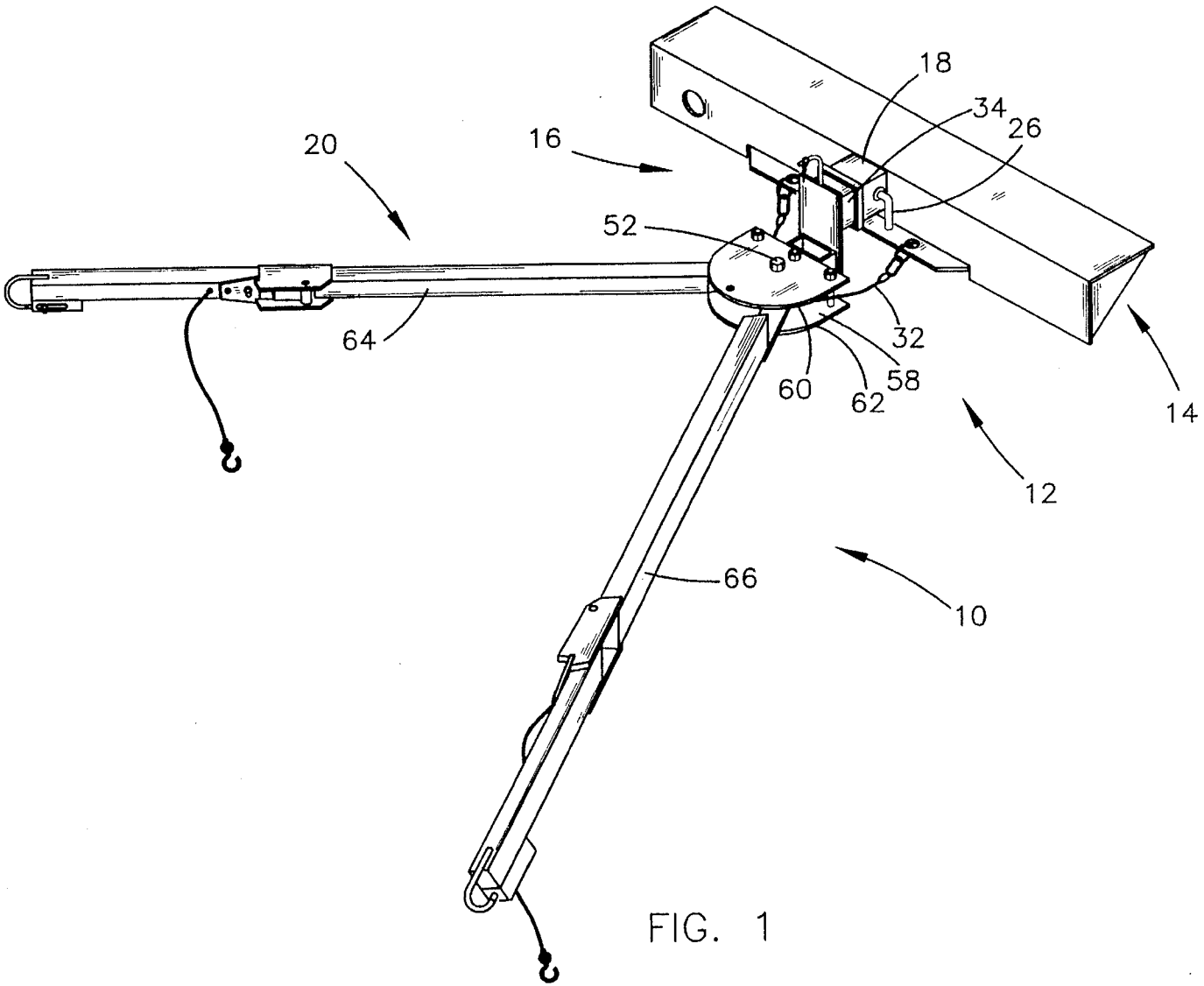
Figure 2:
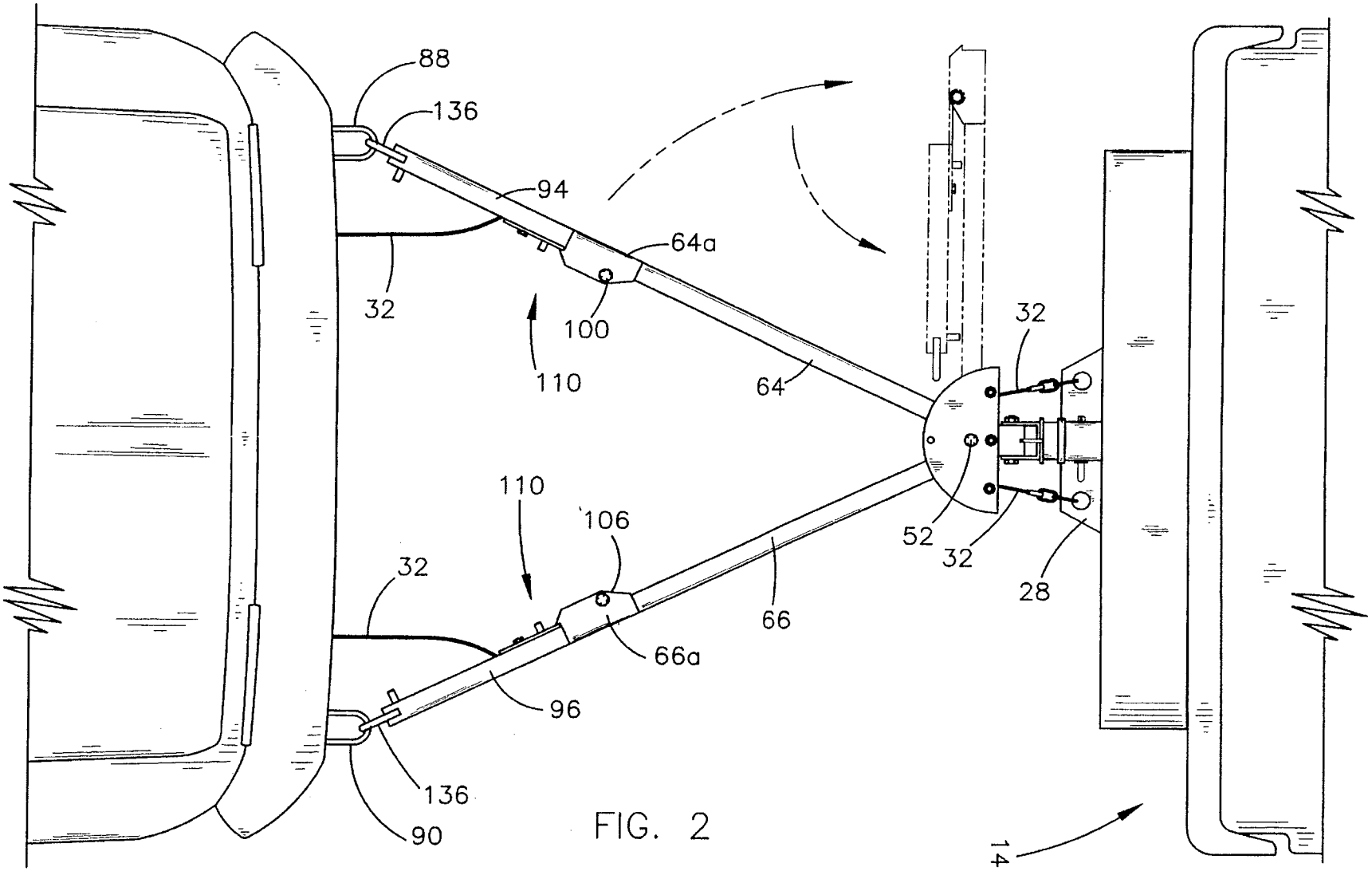
FIG. 2 [has] *is* a top view of the present invention connected between a towing vehicle and a towed vehicle.

Referring now to the drawings, in which similar or corresponding parts are identified with the same reference numeral, and more particularly to FIG. 1, the towing hitch of the present invention is designated generally at 10 and is shown mounted in a conventional receiver hitch 12 on a towing vehicle 14. Towing hitch 10 includes a forward portion identified generally at 16 which may be operably and removably mounted within the receiver hitch tube 18 on receiver hitch 12, and a rearward portion designated generally at 20, which is attached to the towed vehicle 22 (as shown in FIG. 2).

Figure 3:
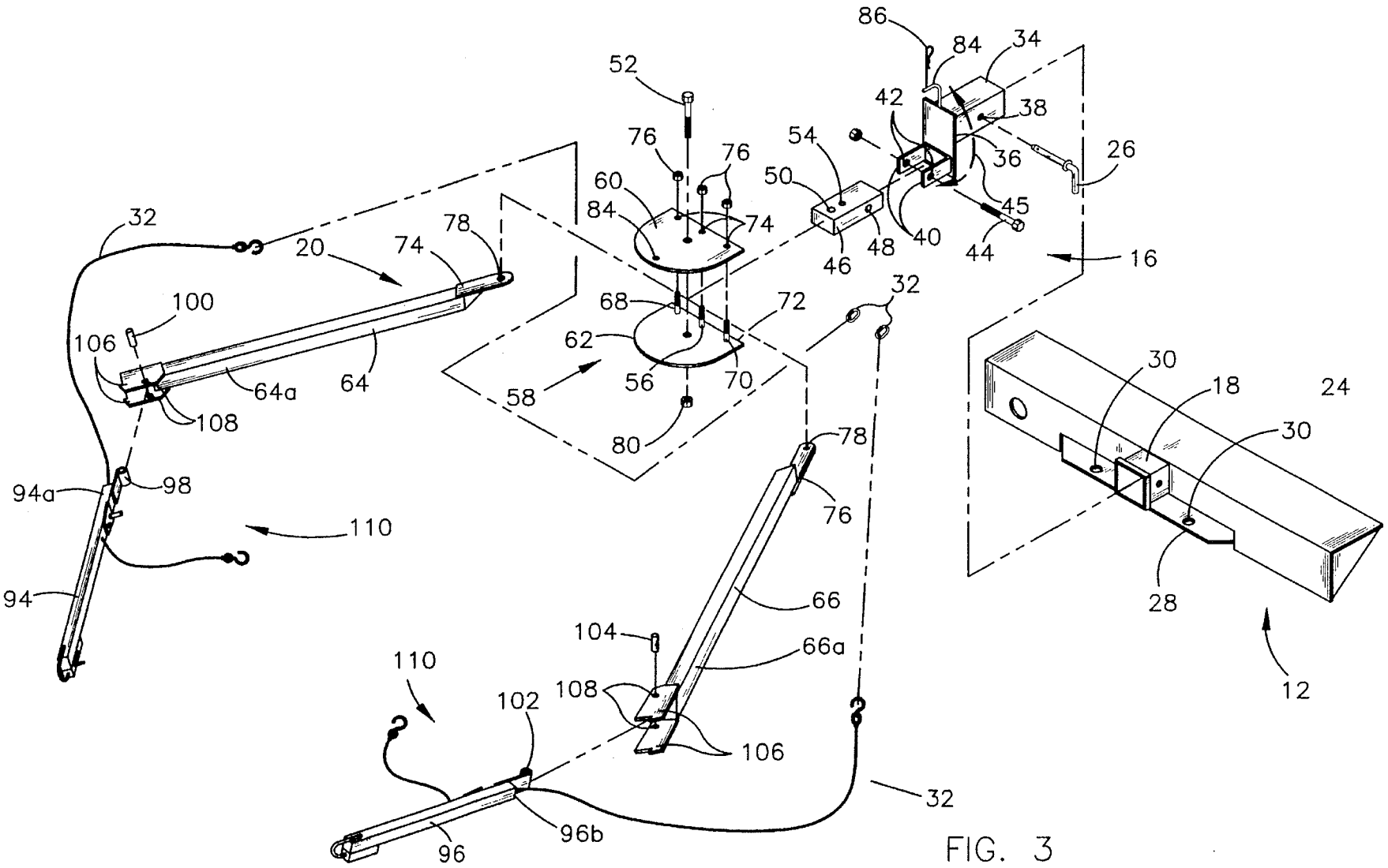
FIG. 3 is an exploded perspective view of the present invention.

Referring now to FIG. 3, receiver hitch 12 is of the conventional type having a hitch tube 18 with an aperture 24 in the side thereof for receiving a locking pin 26. A flange 28 mounted to the lower surface of tube 18 includes a pair of apertures 30 to which safety cables 32 may be attached in a conventional fashion.

Figure 5:
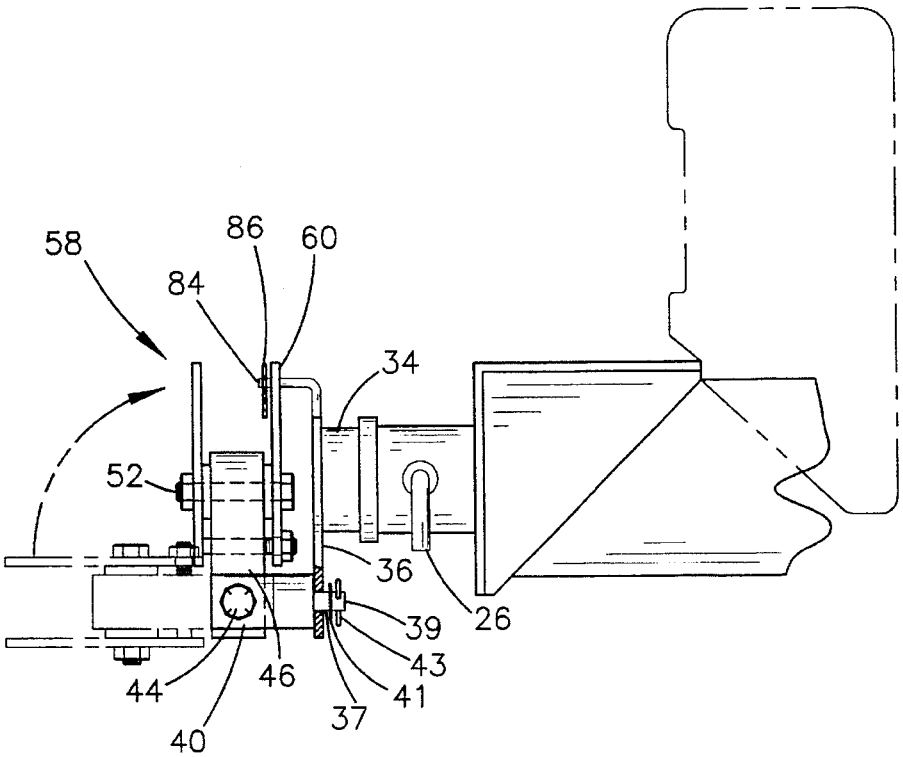
FIG. 5 is side elevational view taken from the right side of FIG. 4.

Forward portion 16 of hitch 10 includes a generally horizontally elongated tube 34 extending forwardly from a depending vertically oriented plate 36. Tube 34 has dimensions for receipt within receiving hitch tube 18, and an aperture 38 in the side thereof for receipt of locking pin 26. Plate 36 has an aperture 37 through the lower end thereof, through which a pin 39 is rotatably journaled (as shown in FIG. 5). Pin 39 has a pair of rearwardly projecting arms 40, forming a yoke, mounted on the rearward end thereof so as to project rearwardly from plate 36. A washer 41 and cotter pin 43 on pin 39 forwardly of plate 36, permit free rotation of pin 39 and arms 40, as shown by srrow 45 in FIG. 3. Arms 40 are parallel and spaced apart to receive a pivot block 46 therebetween, and have coaxial apertures 42 therethrough for receiving bolt 44.

The forward end of pivot block 46 has a horizontally oriented hole 48 therethrough through which bolt 44 may be journaled to permit pivotal movement of block 46 around bolt 44 between arms 40. A first vertical aperture 50 extends vertically through the rearward end of block 46, which will receive a pivot bolt 52 therethrough, as described in more detail herein below. A second aperture 54 extends vertically through pivot block 46 generally forward of aperture 50 to receive a connector bolt 56 therethrough to mount pivot block 46 to yoke 58, as described herein below.

As shown in FIG. 1, yoke 58 includes a pair of identical upper and lower generally semicircular plates 60 and 62, which are parallel and spaced apart to receive a pair of pivotally mounted elongated bars 64 and 66 therebetween. As shown in FIG. 3, lower plate 62 has three connector bolts 56, 68 and 70 mounted in spaced apart relation along the forward straight edge 72, which project through openings 74 in upper plate 60 to receive nuts 76. As previously noted, center connector bolt 56 connects pivot block 46 to yoke 58, while connector bolts 68 and 70 retain safety plates 60 and 62 together.

The forward end of each elongated bar 64 and 66 has a projecting flange 74 and 76 thereon, respectively, with an aperture 78 therethrough, through which pivot bolt 52 may be journaled. Flange 74 is preferably mounted on the upper surface of an elongated bar 64, which flange 76 is mounted on the lower surface of an elongated 66 such that pivot block 46 acts as a bearing between flanges 74 and 76 between yoke plates 60 and 62. Pivot bolt 52 is then journaled through upper plate 60, flange 74, adapter block 46, flange 76, and lower plate 62 and has a nut 80 mounted on the lower end thereof to fasten the bolt in position. In this way, elongated bars 64 and 66 will pivot towards and away from each other within the same plane, parallel to plates 60 and 62 and the longitudinal axis of pivot block 46.

An aperture 82 is formed in upper plate 60 generally centered along the curved edge thereof which is adapted to receive the end of a locking pin 84 mounted on the upper end of vertical plate 36 on tube 34. As shown in FIG. 5, yoke 58 is pivotable about bolt 44 by virtue of the connection of pivot block 46 on bolt 44. In order to lock yoke 58 in the vertical position shown in FIGS. 4 and 5, a cotter pin 86 is connected through an aperture in the rearward end of locking pin 84 in a conventional fashion, thereby retaining forward plate 60 on the end of locking pin 84. Locking pin 84 will also prevent rotational movement of yoke 58 on pin 39, thereby further locking rearward portion 20 into the storage position.

Refernng now to FIG. 2, towed vehicle 22 has a pair of U-shaped loops 88 and 90 mounted to bumper 92. A pivotal arm 94 is pivotally mounted to the rearward end 64a of elongated bar 64 for selective connection to loop 88, while a pivotal arm 96 is pivotally mounted to the rearward end 66a of elongated bar 66 for selective connection to loop 90. As shown in FIG. 3, the forward end 94a of pivot arm 94 has a hinge collar 98 mounted thereon and oriented vertically to receive a hinge pin 100 therein. Similarly, the forward end 96b of pivot arm 96 has a hinge collar 102 mounted thereon and oriented vertically to receive a hinge pin 104 therein. The rearward ends of elongated bars 64 and 66 each have a pair of hinge plates 106 affixed to the upper and lower faces of the rearward ends 64a and 66a, respectively, for pivotal connection to pivotal arms 94 and 96, respectively. Hinge plates 106 extend rearwardly from elongated bars 64 and 66, and have an aperture 108 therethrough, the apertures in the upper and lower plates being [coaxially.] *coaxial.*

Apertures 108 are aligned with hinge collars 98 and 102 and receive hinge pins 100 and 104, respectively to pivotally connect elongated bar 64 with pivot arm 94, and elongated arm 66 with pivot arm 96, respectively. A locking apparatus is designated generally at 110, which will automatically lock arms 94 and 96 in alignment with bars 64 and 66, respectively.

Figure 6:
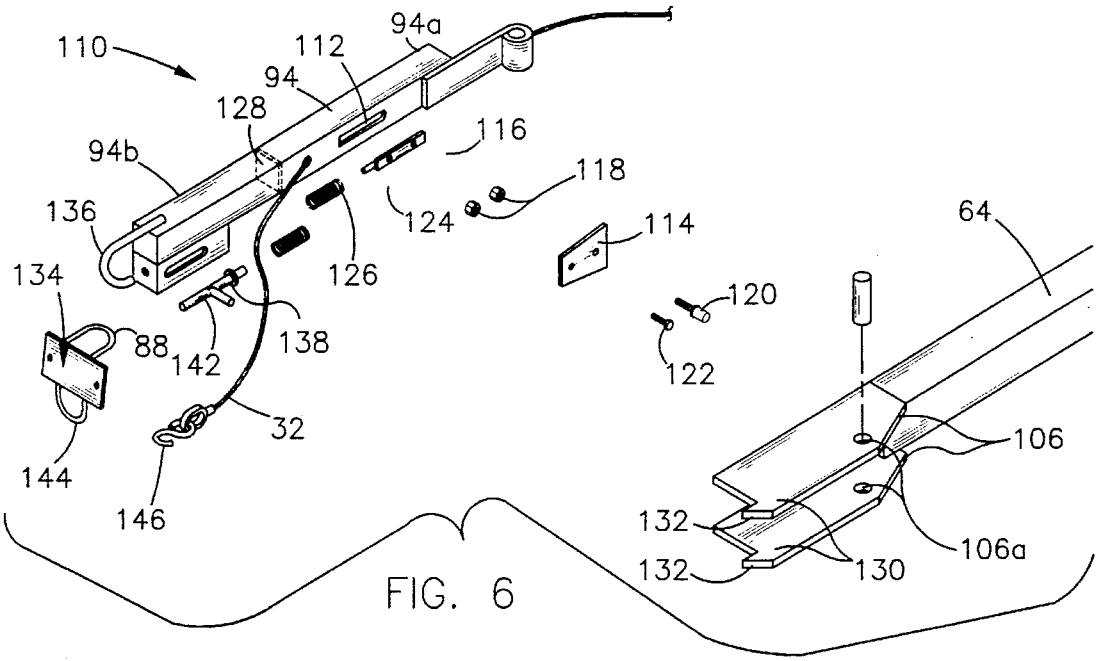
FIG. 6 is an exploded perspective view of one of the pivotal connections between a pivot arm and the associated elongated bar.
Figure 7:
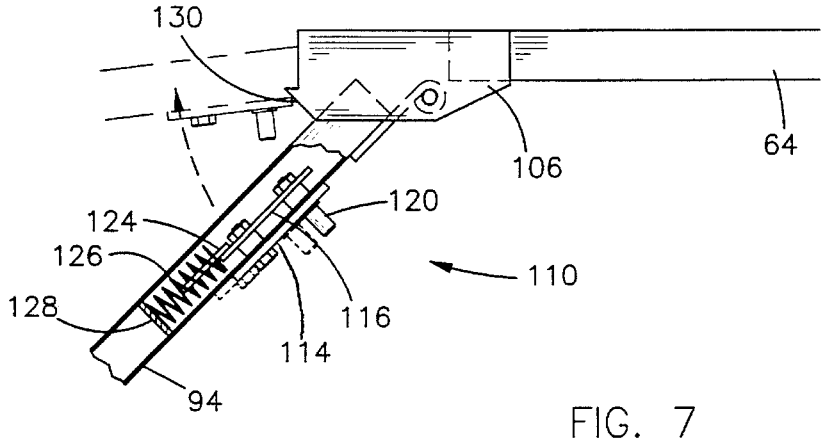
FIG. 7 is a top view of FIG. 6 with portions of the pivotal arm shown in sectional view.
Figure 8:
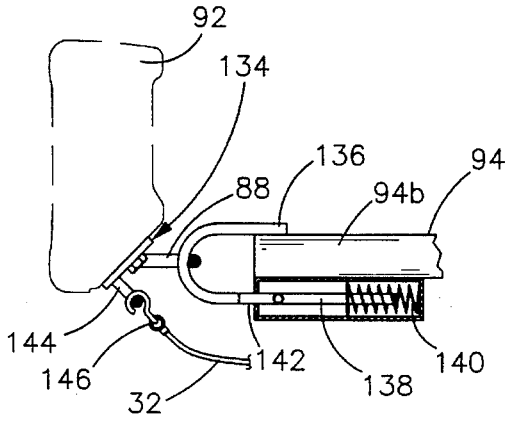
FIG. 8 is a side elevational view of the connection between a pivotal arm and the bumper of a towed vehicle with portions of the pivotal arm shown in sectional view.

Referring now to [FIG. 8,] *FIGS. 6 and 7,* locking apparatus 110 is shown in more detail. Pivot arm 94 is a hollow tubular member, and has a slot 112 formed in one face thereof, to allow access to the interior of the tube. A slide plate 114 is slidably mounted to pivot arm 94 so as to be longitudinally movable between locked and unlocked positions. Slide plate 114 is connected to a backing plate 116 with a pair of spacer rings 118 therebetween. A forward throw pin 120 and rearward bolt 122 each have a threaded end inserted through apertures in slide plate 114, thence through spacer rings 118 and into threaded apertures in back plate 116. In the preferred embodiment, a pair of nuts are affixed to the back of back plate 116 and serve as the threaded aperture into which throw pin 120 and bolt 122 are threaded.

Slide plate 114 and back plate 116 both have dimensions greater than the dimensions of slot 112, such that when slide plate 114 is connected to back plate 116, spacer rings 118 will be positioned in slot 112. Spacer rings 118 thereby allow slide plate 114 to move longitudinally along slot 112.

Back plate 116 has a leg 124 projecting longitudinally and rearwardly therefrom towards rearward end 94b of pivot arm 94. A coil spring 126 is operably engaged on leg 124 and will contact a stop plate 128 mounted within pivot arm 94. Coil spring 126 is sized so as to place a constant biasing force on back plate 116 to retain slide plate 114 in a forward "locked" position within slot 112.

Hinge plates 106 each have a hook portion 130 projecting from the rearward free end 106a thereof. Hook portions 130 are located such that slide plate 114 will be engaged thereon when pivot arm 94 is pivoted into alignment with elongated bar 64. Hook portion 130 has a tapered edge 132 which will cause slide plate 114 to move longitudinally towards the forward end 94a of pivot arm 94 when pivot arm 94 is being moved into alignment with elongated bar 64, as shown in FIG. 7. Once pivot arm 94 is aligned with bar 64, slide plate 114 is biased forwardly into its "locked" position by spring 126, to lock pivot arm 94 and bar 64 in alignment. The locked alignment of pivot arm 94 and elongated bar 64 may be released by grasping throw pin 120 and shifting slide plate 114 rearwardly against the bias of spring 126 to release slide plate 114 from hook portion 130.

A similar locking apparatus 110 is mounted on pivot arm 96 to permit selective locking into an aligned position with elongated bar Referring now to FIG. 8, a side view of bumper 92 is shown with loop 88 mounted thereto on a bracket 134. The rearward end 94b of pivot arm 94 has a hook 136 mounted thereon and extending rearwardly which will be selectively journaled through loop 88. A spring-loaded latch 138 is slidably mounted within a latch housing 140, and has a projecting rod 142 aligned with the free end of hook 136 to selectively contact hook 136. Thus, hook 136 can be locked into position on loop A small loop 144 is also mounted on bracket 134 to receive a hook 146 mounted on safety cable 32. Preferably, safety cables 32 are threaded through arms 94 and 96 and bars 64 and 66, between their respective connecting points.

Towing hitch 10 is mounted on the towing vehicle 14 by inserting tube 34 of forward portion 16 into receiver hitch tube 18 and inserting locking pin 26, as shown in FIG. 1. Pivot arms 94 and 96 are then connected to their associated towing loops 88 and 90 by connecting hooks 136 to the towing loops 88 and 90, as shown in FIG. 2. Safety cables 32 are connected at one end to flange 28, and at their other ends to their associated loops 144 (as shown in FIG. 8). The pivotal connection of pivot block 46 to arms 40 permits movement of a towed vehicle vertically over bumps and on grades. The rotational capability of arms 40 on pin 39 permits movement of a towed vehicle about an axis parallel to the direction of towing, on transverse slopes or over bumps along only one side of the vehicle.

Figure 4:
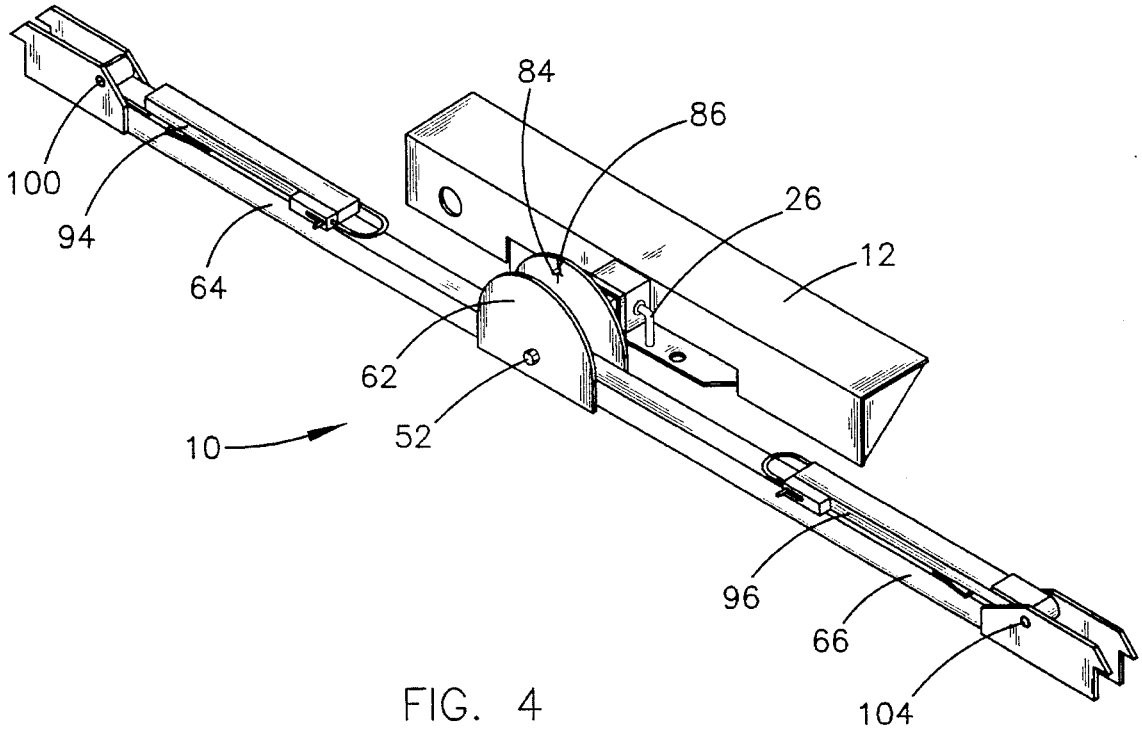
FIG. 4 is a perspective view of the invention mounted on a receiver hitch and positioned in a storage position.

When the desired destination has been reached, the pivot arms may be easily and quickly disconnected from the towed vehicle, and the safety cables 32 released, to permit virtually immediate use of the towed vehicle 22. The towing hitch 10 may be collapsed into its storage position by initially unlocking locking apparatus 110 to allow pivot arms 94 and 96 to pivot about hinge pins 100 and 106, as shown in broken lines in FIG. 2. Elongated bars 64 and 66 may then be pivoted forwardly into a position parallel to the rear of the towing vehicle 14 about pivot bolt 52. As shown in FIG. 5, the hitch may then be pivoted about bolt 64 to a generally vertical position, and locked in place by cotter pin 86 on locking pin 84, as shown in FIGS. 4 and 5. For extended periods of storage, hitch 10 may be removed from receiver hitch 12 simply by removing locking pin 26 to release hitch 10 from receiver hitch 12.

Whereas the invention has been shown and described in connection with the preferred embodiment thereof, it will be understood that many modifications, substitutions and additions may be made which are within the intended broad scope of the appended claims. There has therefore been shown and described an improved towing hitch which accomplishes at least all of the above stated objectives.

I claim:

1. A towing hitch, comprising:

a frame having a forward portion for selective removable connection to a towing vehicle, and a rearward portion for selective removable connection to a vehicle to be towed;

said forward portion including a generally horizontal forwardly extending member adapted for selectively lockable receipt within a conventional receiver hitch;

said rearward portion including first and second elongated bars having forward and rearward ends, the forward ends of said bars pivotally connected to a pivot bolt for pivotal movement within the same plane about said pivot bolt;

[a first pivot arm pivotally connected at a forward end to the rearward end of said first bar for pivotal movement coplanar with said first and second bars;

a second pivot arm pivotally connected at a forward end to the rearward end of said second bar for pivotal movement coplanar with said first and second bars;

connection means connected to rearward ends of said pivot arms for selective removable connection to a vehicle to be towed;

means connected to said first pivot arm and first bar for selectively locking said FIrst pivot arm and first bar in axial alignment;

means connected to said second pivot arm and second bar for selectively locking said second pivot arm and second bar in axial alignment;]

said rearward portion further including a pivot block having upper and lower surfaces, forward and rearward ends, and opposing side surfaces, pivotally connected to said forward portion on a generally horizontal pivot axis extending through said side surfaces of the pivot block;

said pivot bolt being mounted through the upper and lower surfaces of said pivot block, rearwardly of and perpendicular to the pivot block pivot axis, so as to pivot with said pivot block;

said pivot block connected for pivotal movement between a storage position, wherein the pivotal plane of the [arms and] bars is generally vertical, and a towing position, wherein the pivotal plane of the [arms and] bars is generally horizontal.

2. The hitch of claim 1, further comprising means on said forward portion for selectively locking said pivot block in storage position.

3. The hitch of claim 1, wherein said pivotal connection of the pivot block to the forward portion further comprises:

a pin having forward and rearward ends, rotatably connected to said forward portion for free rotatable movement about the pin's longitudinal axis;

a pair of spaced-apart, parallel arms projecting rearwardly from the rearward end of said pin;

said arms for pivotal movement within a plane parallel to said arms and about an axis perpendicular to the rotational axis of said pin.

*4. The hitch of claim 1, further comprising*

*a first pivot arm having a forward end and a rearward end, said first pivot arm pivotally connected at said forward end to the rearward end of said first bar for pivotal movement coplanar with said first and second bars;*

*a second pivot arm having a forward end and a rearward end, said second pivot arm pivotally connected at said forward end to the rearward end of said second bar for pivotal movement coplanar with said first and second bars; and*

*connection means connected to said rearward ends of said pivot arms for selective removable connection to said vehicle to be towed.*

*5. The hitch of claim 4, further comprising:*

*means connected to said first pivot arm and first bar for selectively locking said first pivot arm and first bar in axial alignment; and*

*means connected to said second pivot arm and second bar for selectively locking said second pivot arm and second bar in axial alignment.*

*6. A towing hitch, comprising:*

*a frame having a forward portion for selective removable connection to a towing vehicle, and a rearward portion for selective removable connection to a vehicle to be towed;*

*said forward portion including a generally horizontally forwardly extending member adapted for selectively lockable receipt within a conventional receiver hitch;*

*said rearward including first and second elongated bars having forward and rearward ends, the forward ends of*

*said bars pivotally connected to a pivot bolt for pivotal movement within the same plane about said pivot bolt;*

*said rearward portion further including a pivot member having upper and lower surfaces, forward and rearward ends, and opposing side surfaces, pivotally connected to said forward portion on a generally horizontal pivot axis extending through said side surfaces of the pivot member;*

*said pivot bolt being mounted through the upper and lower surfaces of said pivot member rearwardly of and perpendicular to the pivot member pivot axis, so as to pivot with said pivot member;*

*said pivot member connected for pivotal movement between a storage position, wherein the pivotal plane of the bars is generally vertical, and a towing position, wherein the pivotal plane of the bars is generally horizontal.*

*7. A towing hitch, comprising:*

*a frame having a forward portion for selective removable connection to a towing vehicle, and a rearward portion for selective removable connection to a vehicle to be towed;*

*said forward portion including a generally horizontal forwardly extending member adapted for selectively lockable receipt within a conventional receiver hitch;*

*said rearward portion including first and second elongated bars having forward and rearward ends, the forward ends of said bars pivotally connected to a pivot bolt for pivotal movement within the same plane about said pivot bolt;*

*said rearward portion further including pivot means for pivotal movement of said rearward portion about a transverse horizontal axis, said transverse horizontal axis located forwardly of and perpendicular to said pivot bolt, said pivot means allowing for pivotal movement of said rearward portion between a storage position, wherein the pivotal plane of the bars is generally vertical, and a towing position, wherein the pivotal plane of the bars is generally horizontal.*

*8. A towing hitch, comprising:*

*a frame having a forward portion for selective removable connection to a towing vehicle, and a rearward portion for selective removable connection to a vehicle to be towed;*

*said forward portion including a generally horizontal forwardly extending member adapted for selectively lockable receipt within a conventional receiver hitch;*

*said rearward portion including first and second elongated bars having forward and rearward ends, the forward ends of said bars pivotally connected to a pivot bolt for pivotal movement within the same plane about said pivot bolt;*

*a first pivot arm pivotally connected at a forward end to the rearward end of said first bar for pivotal movement coplanar with said first and second bars;*

*a second pivot arm pivotally connected at a forward end to the rearward end of said second bar for pivotal movement coplanar with said first and second bars;*

*connection means connected to rearward ends of said pivot arms for selective removable connection to a vehicle to be towed;*

*means connected to said first pivot arm and first bar for selectively locking said first pivot arm and first bar in axial alignment;*

*means connected to said second pivot arm and second bar for selectively locking said second pivot arm and second bar in axial alignment;*

*said rearward portion further including a pivot block having upper and lower surfaces, forward and rearward ends, and opposing side surfaces, pivotally connected to said forward portion on a generally horizontal pivot axis extending through said side surface of the pivot block;*

*said pivot block being mounted through the upper and lower surfaces of said pivot block, rearwardly of and perpendicular to the pivot block pivot axis, so as to pivot with said pivot block;*

*said pivot block connected for pivotal movement between a storage position, wherein the pivotal plane of the arms and bars is generally vertical, and a towing position, wherein the pivotal plane of the arms and bars is generally horizontal.*

*9. The hitch of claim 8, further comprising means on said forward portion for selectively locking said pivot block in storage position.*

*10. The hitch of claim 8, wherein said pivotal connection of the pivot block to the forward portion further comprises:*

*a pin having forward and rearward ends, rotatably connected to said forward portion for free rotatable movement about the pin's longitudinal axis;*

*a pair of spaced-apart, parallel arms projecting rearwardly from the rearward end of said pin;*

*said arms for pivotal movement within a plane parallel to said arms and about an axis perpendicular to the rotational axis of said pin.*

* * * * *